United States Patent
Cheng et al.

(10) Patent No.: US 10,733,953 B2
(45) Date of Patent: Aug. 4, 2020

(54) METHOD FOR ADJUSTING OUTPUT IMAGES AND MULTI-PICTURES DISPLAY SYSTEM

(71) Applicant: ViewSonic International Corporation, New Taipei (TW)

(72) Inventors: Bonny Cheng, New Taipei (TW); Chien-Heng Huang, New Taipei (TW); Shr-Jung Jan, Kaohsiung (TW)

(73) Assignee: ViewSonic International Corporation, New Taipei (TW)

(*) Notice: Subject to any disclaimer, the term of this patent is extended or adjusted under 35 U.S.C. 154(b) by 54 days.

(21) Appl. No.: 16/046,972

(22) Filed: Jul. 26, 2018

(65) Prior Publication Data

US 2019/0035354 A1    Jan. 31, 2019

(30) Foreign Application Priority Data

Jul. 27, 2017    (TW) .............................. 106125261 A

(51) Int. Cl.
*G09G 5/00* (2006.01)
*G06T 3/40* (2006.01)
(Continued)

(52) U.S. Cl.
CPC .............. *G09G 5/005* (2013.01); *G06F 3/14* (2013.01); *G06T 3/40* (2013.01); *G09G 5/14* (2013.01);
(Continued)

(58) Field of Classification Search
None
See application file for complete search history.

(56) References Cited

U.S. PATENT DOCUMENTS

2003/0099395 A1* 5/2003 Wang ................. G06K 9/00248
382/165
2006/0082570 A1* 4/2006 Noorbakhsh .......... G09G 5/006
345/211
(Continued)

FOREIGN PATENT DOCUMENTS

CN    101377920    3/2009
CN    102520842    6/2012
(Continued)

OTHER PUBLICATIONS

"Office Action of Taiwan Counterpart Application," dated Nov. 27, 2018, p. 1-p. 6.
(Continued)

*Primary Examiner* — Tapas Mazumder
(74) *Attorney, Agent, or Firm* — JCIPRNET

(57) ABSTRACT

A method for adjusting output images and multi-pictures display system are provided. The method includes following steps. A monitor resolution, a multi-pictures display mode and a rotation status of a display device are obtained. A display setting in an operating system (OS) of an image source apparatus is obtained. Whether the display setting in the OS satisfies an optimal display condition is determined according to the monitor resolution, the multi-pictures display mode and the rotation status of the display device. If the display setting does not satisfy the optimal display condition, the display setting in the OS is adjusting according to the optimal display condition. If the display setting satisfies the optimal display condition, a plurality of pixels of a single frame output by the image source device is one-by-one corresponding to a plurality of pixel units of the display device configured for displaying the single frame.

10 Claims, 8 Drawing Sheets

(51) Int. Cl.
  *G09G 5/14* (2006.01)
  *G06F 3/14* (2006.01)

(52) U.S. Cl.
  CPC ........... *G09G 2340/0407* (2013.01); *G09G 2340/0492* (2013.01); *G09G 2370/047* (2013.01)

(56) References Cited

U.S. PATENT DOCUMENTS

| | | | |
|---|---|---|---|
| 2007/0126712 A1* | 6/2007 | Park | G06F 3/0488 345/173 |
| 2009/0059073 A1* | 3/2009 | Cho | H04N 5/44591 348/565 |
| 2013/0194176 A1* | 8/2013 | Chung | G06F 3/0346 345/156 |
| 2014/0292776 A1* | 10/2014 | Tanaka | G09G 5/006 345/520 |
| 2017/0039680 A1* | 2/2017 | Abe | G06F 3/04847 |

FOREIGN PATENT DOCUMENTS

| | | |
|---|---|---|
| CN | 103226396 | 7/2013 |
| CN | 104703015 | 6/2015 |
| TW | 591944 | 6/2004 |
| TW | 201009691 | 3/2010 |
| TW | 201234315 | 8/2012 |
| WO | 2013167081 | 11/2013 |

OTHER PUBLICATIONS

"Office Action of China Counterpart Application," dated Feb. 6, 2020, p. 1-p. 8.

* cited by examiner

METHOD FOR ADJUSTING OUTPUT IMAGES AND MULTI-PICTURES DISPLAY SYSTEM

CROSS-REFERENCE TO RELATED APPLICATION

This application claims the priority benefit of Taiwan application serial no. 106125261, filed on Jul. 27, 2017. The entirety of the above-mentioned patent application is hereby incorporated by reference herein and made a part of this specification.

TECHNICAL FIELD

The disclosure relates to a display system, in particular to, a multi-pictures display mode.

BACKGROUND

With the progress of display technology, the display is developed to provide various functions. By wired or wireless transmitting technique, the display device can display the corresponding picture for the user according to the image data provided by the image source device. The multi-pictures display function makes the display device capable of showing multiple pictures of multiple signal sources together on the single display device, and hence the user can view multiple pictures or watch multiple programs through the single display device at the same time.

In order to display multiple pictures together on the display device, the current method in which the multiple image source devices are respectively connected to the single display device by the user is utilized, such that the display device can receive multiple image sources and display multiple pictures together by using display panel thereof. Generally, the display device may inform these image source devices about its specification (e.g. the monitor resolution and the refresh rate, etc) and the model type when the display device is connected to these image source devices. On the other hand, the image source device may generally record the specification and the model type of the display device to provide the image data according to the monitor resolution supported by the display device. However, when the display device performing the multi-pictures function, the display region of the display panel may be divided into multiple display areas to respectively display the pictures of these image source device. In this situation, the scaler of the display device needs to perform additional scaling processing to the received image data when the image source device still provides the image data based on the monitor resolution informed by the display device or the resolution which hasn't been adjusted manually, which easily causes that the displayed pictures are distorted or are not as good as the user expected.

SUMMARY OF THE DISCLOSURE

Accordingly, a method for adjusting output images and a multi-pictures display system are provided, which automatically adjust the OS resolution setup by the operating system according to a monitor resolution, a rotation status and a multi-pictures display mode of the display device, such that the displayed picture being distorted or not as good as the user expected can be avoid.

According to one of the exemplary embodiments, the method for adjusting output images is provided, wherein an image source device outputs the image data to a display device based on the setup of the operating system of the image source device. The method includes following steps. A monitor resolution, a multi-pictures display mode and a rotation status of the display device of the display device are obtained. A display setting in an operating system (OS) of the image source device is obtained. Whether the display setting for controlling display range of the output frame in the OS satisfies an optimal display condition estimated by the image source device according to the current operating state of the display device is determined according to the monitor resolution, the multi-pictures display mode and the rotation status. If the display setting for controlling display range of the output frame in the OS does not satisfy the optimal display condition estimated by the image source device according to the current operating state of the display device, the display setting of the image source device is adjusted according to the optimal display condition estimated by the image source device according to the current operating state of the display device, such that the image source device outputs the image data satisfying the rotation status and the optimal resolution estimated according to the current operating state of the display device. If the display setting setup by the OS satisfies the optimal display condition estimated by the image source device according to the current operating state of the display device, a plurality of pixels of a single frame outputted by the image source device is one-by-one corresponding to a plurality of pixel unit of the display device configured to display the single frame.

According to one of the exemplary embodiments, the display setting in the OS includes an OS resolution and a picture displaying direction.

According to one of the exemplary embodiments, the step of determining whether the display setting satisfies the optimal display condition according to the monitor resolution, the multi-pictures display mode and the rotation status includes the following steps. An optimal resolution of the optimal display condition is calculated according to the monitor resolution, the multi-pictures display mode and the rotation status. Next, whether the OS resolution is equal to the optimal resolution is determined.

According to one of the exemplary embodiments, the step of determining whether the display setting satisfies the optimal display condition according to the monitor resolution, the multi-pictures display mode and the rotation status includes the following step. Whether the picture displaying direction of the display setting is consistent with the rotation status is determined.

According to one of the exemplary embodiments, the multi-pictures display mode includes a picture in picture (PIP) mode, a picture by picture (PBP) mode, and a picture on picture (POP) mode.

According to one of the exemplary embodiments, the rotation status includes a transverse status and a longitudinal status.

According to one of the exemplary embodiments, the method further comprises the following steps. The rotation status of the display device is sensed by using a gravity sensor. Next, the rotation status of the display device is transmitted to the image source device.

According to one of the exemplary embodiments, the monitor resolution is recorded in extended display identification data (EDID).

Form the other aspect, according to one of the exemplary embodiments, a multi-pictures display system including a display device and an image source device is provided. The image source device provides image data to the display device and includes a memory element and a processor. The memory element records an operating system and an adjusting module. The processor is coupled to the memory element and is configured to execute the operating system and the adjusting module to: obtain a monitor resolution, a multi-pictures display mode and a rotation status of the display device; obtain a display setting in an operating system (OS) of the image source device; determine whether the display setting satisfies an optimal display condition according to the monitor resolution, the multi-pictures display mode and the rotation status; and adjust the display setting according to the optimal display condition if the display setting does not satisfy the optimal display condition, such that the image source device outputs the image data satisfying the optimal resolution and the rotation status of the display device. If the display setting satisfies the optimal display condition, a plurality of pixels of a single frame outputted by the image source device is one-by-one corresponding to a plurality of pixel unit of the display device configured to display the single frame.

According to one of the exemplary embodiments, the display device includes a display panel and a scaling processor. The display panel displays a picture of the image data. The scaling processor is coupled to the display panel, receives the image data to drive the display panel according to the image data. The scaling processor transmits the monitor resolution, the multi-pictures display mode and the rotation status of the display device to the processor in response to a request sent by the processor.

According to one of the exemplary embodiments, the display further includes a gravity sensor, and the gravity sensor is configured to sense the rotation status of the display device.

According to one of the exemplary embodiments, the display device further includes a memory recording extended display identification data (EDID), and the monitor resolution is recorded in the extended display identification data.

Based on the above, in the embodiments of the disclosure, the image source providing the image data may determine the optimal display condition according to the monitor resolution, the multi-pictures display mode and the rotation status, and adjust the display setting of the OS according to the optimal display condition, such that the image source may output the image data satisfying the optimal resolution and the rotation status of the display device according to the adjusted display setting. In this way, when the display device operates in the multi-pictures display mode, the scaling processor of the display device does not need to perform scaling processing or rotating processing on the image data outputted from the image source device, so as to prevent the displayed picture being distorted or not as expected.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
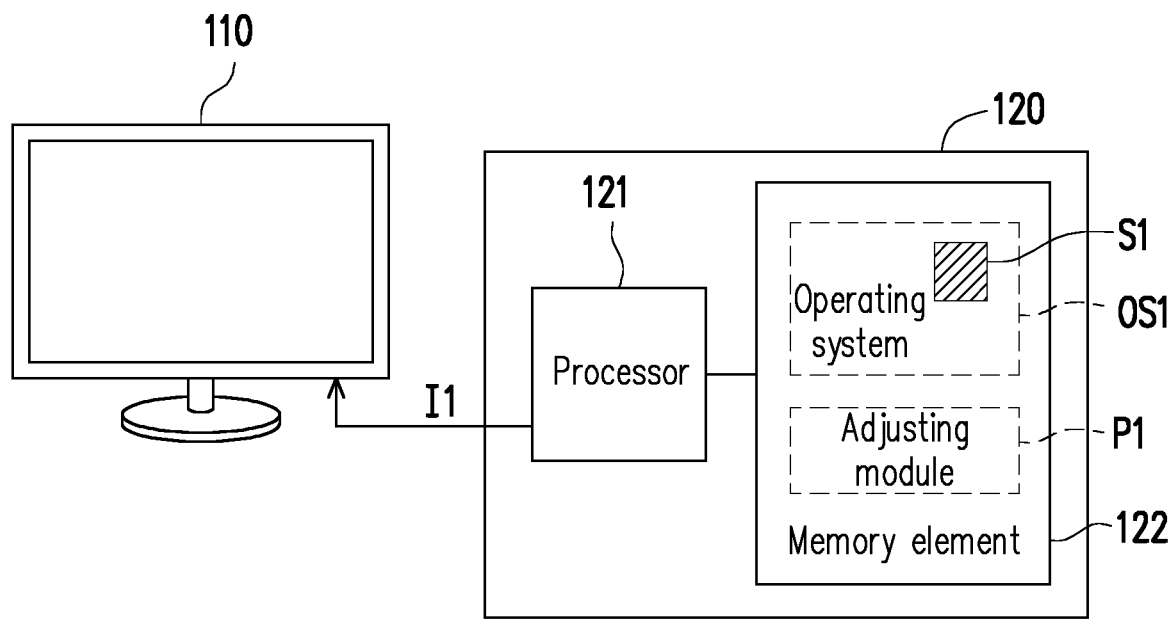
FIG. 1 illustrates a schematic diagram of a multi-pictures display system in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a multi-pictures display system in accordance with one of the exemplary embodiments of the disclosure. Referring to FIG. 1, a multi-pictures display system 10 includes, but not limited to, a display device 110 and an image source device 120, and the image source device 120 is connected to the display device 110 to provide image data I1 to the display device 110. The display device 110 may be, for example, a liquid crystal (LCD) display, a light-emitting diode (LED) display, a field emission display (FED) or other types of displays. The disclosure is not limited in this regard.

The image source device 120 may provide the image data I1 to the display device 110 for displaying and may be, for example, a personal computer (PC), a tablet, a smart phone, a set top box (STB), a TV game machine, a DVD player or the like. Namely, the display device 110 may display pictures viewed by the user according to the image data I1. In addition, the example of FIG. 1 and the embodiment thereof below will be illustrated with one image source device 120, but the number of the image source device is not limited in the disclosure. The image source device 120 being as an example includes a processor 121 and the memory element 122.

The memory element 122 is configured for storing data and may be, for example, one or a combination of a stationary or mobile random access memory (RAM), a read-only memory (ROM), a flash memory, a hard drive, other similar devices or integrated circuits. The type of the memory element 122 is not limited in the disclosure. Many types of software components, such as the operating system, the driver, various types of instructions and the like, and the data may be loaded in the memory element 122 for executing and utilizing by the processor 121. In the present disclosure, the software components recording in the memory element 122 include the operating system OS1 and the adjusting module P1.

The processor 121 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar devices, a combination of aforementioned devices or integrated circuits. The processor 121 is coupled to the memory element 122 and configured to access the operating system OS1 and the adjusting module P1 loaded in the memory element 122. In one embodiment, the processor 121 may further include a graphic processing unit (GPU) to generate the image data I1 adapted to output to the display device 110. For example, the processor 121 of FIG. 1 may be implemented as a central processing chip embedded with a GPU. Alternatively, the processor 121 may be implemented as the combination of a central processing chip and a GPU on the independent graphics card.

In the embodiments of the disclosure, the monitor resolution of the display device 110 represents the best resolution which the hardware specification of the display device 110 is capable of supporting, and is determined by the number of the pixel units and the arrange manner of pixel units the on the display panel. For example, the monitor resolution of the display device 110 may be 3840*2160, which means the display panel is formed by the arranged 3840*2160 pixel units. Besides, the image data I1 provided by the image source device 120 includes at least one frame, and the frame is composed of multiple picture pixels. When the display device 110 receives the image data I1, a scaler of the display device 110 may determine whether the ratio between the pixel resolution of the pixels in the single fame of the image data I1 and the number of the pixel units configured for displaying the single frame in the display device 110 is 1:1. If no, the scaler of the display device 110 may perform scaling processing to the image data I1 and then the scaled image data is provided to the pixel units for displaying.

It should be noted that, in the embodiments of the disclosure, the processor 121 may determine whether the display setting in the OS satisfies the optimal display condition. Herein, the optimal display condition represents multiple pixels in the single frame outputted by image source device 120 are one-by-one corresponding to the pixel units configured for displaying the single frame on the display device 110. Hence, the scaler of the display device 110 does not need to perform additional scaling processing to the image data I1. Such that, the user would not need to manually switch the display setting setup by the OS for adapting the rotation and the multi-pictures display mode.

Figure 2:
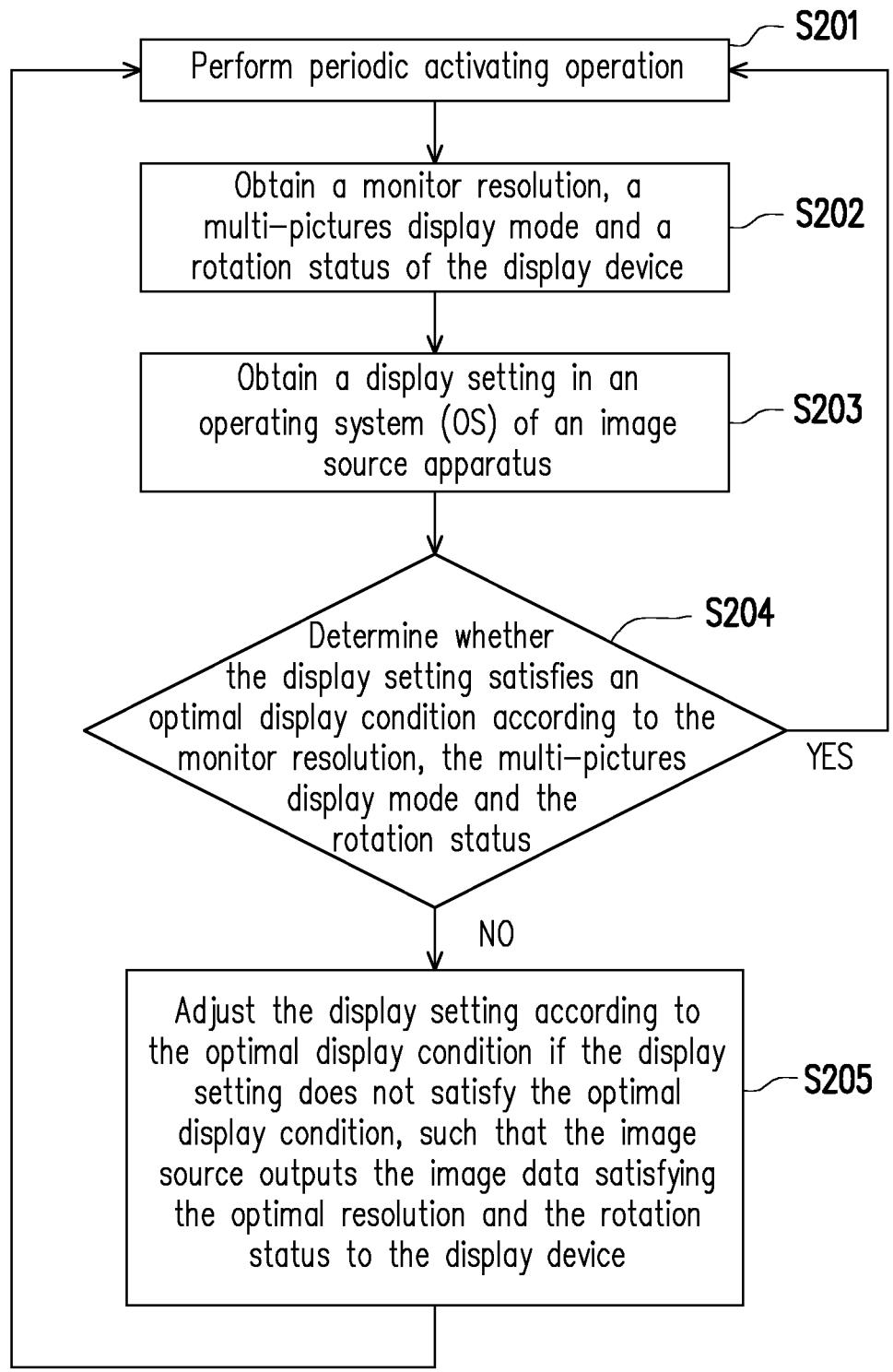
FIG. 2 illustrates a flowchart of a method for adjusting output images in accordance with one of exemplary embodiments of the disclosure.

FIG. 2 illustrates a flowchart of a method for adjusting output images in accordance with one of exemplary embodiments of the disclosure. Referring to FIG. 1 and FIG. 2, the method of the present embodiment is adapted to the multi-pictures display system 10 in FIG. 1. In the following, detailed steps of the method for adjusting output images of the present embodiment are explained with reference to the elements in the multi-pictures display system 10.

In the step S201, the processor 121 may perform periodic activating operation. Specifically, the processor 121 may periodically check the status of the display setting in the OS to periodically determine whether to adjust the display setting in the OS. For example, the processor 121 may be triggered to check the status of the display setting in the OS every cycle, such as 10 seconds, 20 seconds or the like, through operation of a timer. Such that, the consumed computing resource may be decreased. In the embodiments of the disclosure, it can be assumed that, after the timer counts to 10 seconds, the processor 121 may be triggered to perform the next step S202.

In the step S202, the processor 121 may obtain the monitor resolution, the multi-pictures display mode and the rotation status of the display device 110. Herein, the display device 110 supports multi-pictures display function, and hence the display device 110 is capable of displaying one of the multiple pictures according to the image data I1 provided by the image source device 120. The number and the arrange manner of the pictures displayed by the display device 110 are determined by the multi-pictures display mode selected by the user. The multi-pictures display mode may include a picture in picture (PIP) mode, a picture by picture (PBP) mode and a picture on picture (POP) mode. The PBP mode may include an up/down PBP mode and a left/right PBP mode based on the arrange manner of the side-by-side pictures. The POP mode may include 4-split POP mode, 9-split POP mode, 16-split POP mode and the like based on the number of the split pictures. In addition, the placed status of the display device 110 is rotatable. In one of the embodiments, the rotation status of the display device 110 may include a transverse status and a longitudinal status.

Next, in the step S203, the processor 121 may obtain the display setting S1 in the operating system OS1 of the image source device 120. In the example of FIG. 1, the operating system OS1 of the image source device 120 may record the display setting S1, and the display setting S1 may be setup by the user manually. For example, the user may setup the display setting S1 through the windows interface provided by the operating system OS1. The image source device 120 may transfer the original image data according to the display setting S1 to output the image data I1 complying the display setting S1 to the display device 110. The display setting S1 in the operating system OS1 may include an OS resolution and a picture displaying direction.

Afterward, in the step S204, the processor 121 may determine whether the display setting satisfies the optimal display condition according to the monitor resolution, the multi-pictures display mode and the rotation status. In the step S205, the processor 121 may adjust the display setting according to the optimal display condition if the display setting does not satisfy the optimal display condition, such that the image source device 120 outputs the image data satisfying the optimal resolution and the rotation status of the display device 110. After the step S205, returning to the step S201, the processor 121 may perform periodic activating operation again to use the timer to time, so as to cyclically perform the steps S201 to S205 periodically.

It is worth to note that, in the embodiments of the disclosure, if the display setting satisfies the optimal display condition, a plurality of pixels of a single frame outputted by the image source device is one-by-one corresponding to a plurality of pixel unit of the display device configured to display the single frame. That is, the processor 121 of the image source device 120 may recognize the optimal display condition according to the multi-pictures display mode, the monitor resolution and the rotation status of the display device 110, and may automatically adjust the display setting S1 according to the optimal display condition, such that the image source device 120 may output the image data satisfying the optimal condition. In this way, the scaler of the display device 110 may not need to perform the additional scaling processing to the image data I1, and each pixel data of the image data I1 may respectively corresponds to each pixel unit of the display device 110 so as to display pictures according to the optimal resolution without distortion.

Figure 3:
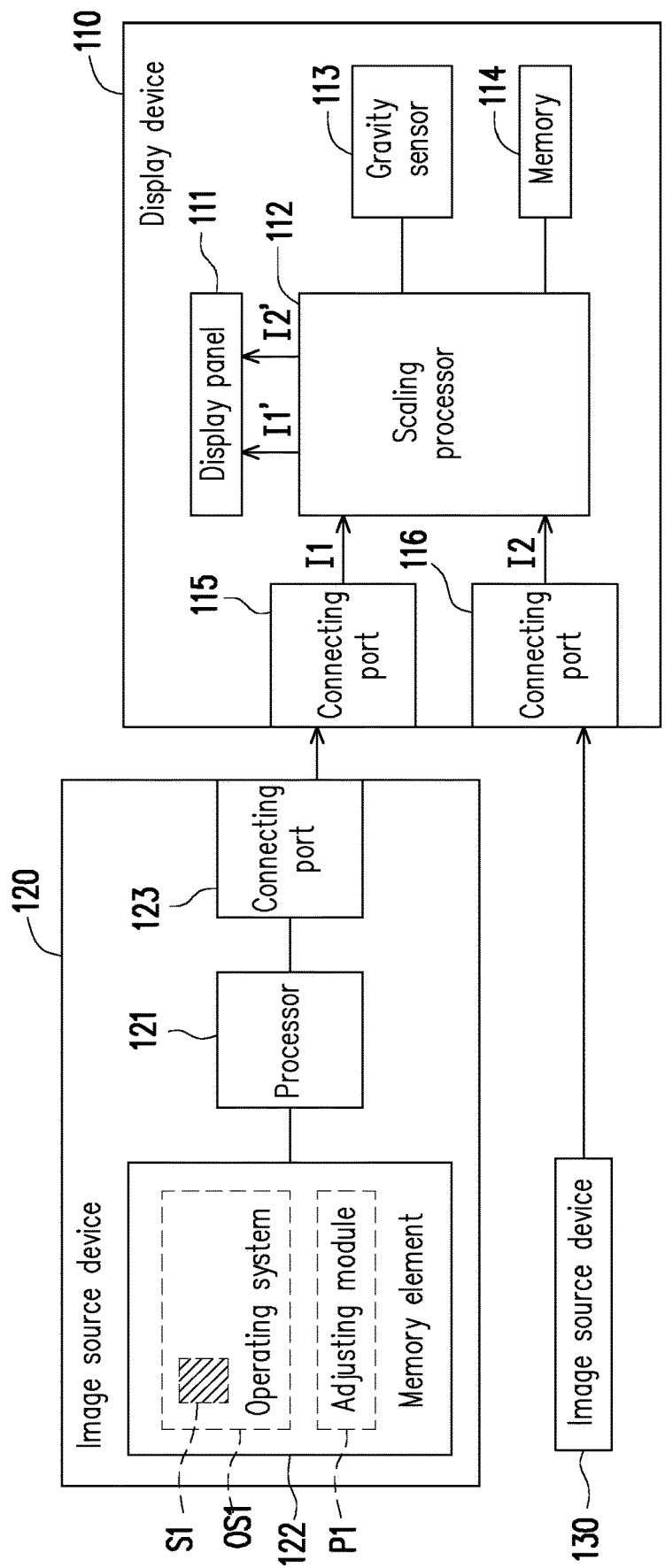
FIG. 3 illustrates a schematic diagram of a multi-pictures display system in accordance with one of the exemplary embodiments of the disclosure.

FIG. 3 illustrates a schematic diagram of a multi-pictures display system in accordance with one of the exemplary embodiments of the disclosure. Referring to FIG. 3, the multi-pictures display system 30 includes the display device 110, the image source device 120 and the image source device 130. The display device 110 is respectively connected to the image source device 120 and 130 to receive the image data I1 and the image data I2 from the image source device 120 and the image source device 130. The detail of the components of the image source device 120 is illustrated in FIG. 1 and would not be described herein. The image source device 130 is another electronic device providing the image data I2 and may be, for example, a personal PC, a tablet, a smart phone or the other kinds of the electronic devices. In the example of FIG. 3, the display device 110 may display at least two pictures according to at least the image data I1 and I2. For example, the image source device 120 and 130 connected to the display device 110 may respectively be a personal PC and a smart phone, and the display device 110 may display the pictures of the personal PC and the smart phone together.

It should be noted that, the display device 110 in FIG. 3 may include a display panel 111, a scaling processor 112, a gravity sensor 113, a memory 114, a connecting port 115 and a connecting port 116. The display panel 111 may be, for example, a LED display panel, a LCD display panel, a FED display panel or other kinds of display panels. The scaling processor 112 is coupled to the display panel 111, the gravity sensor 113, the memory 114 and the connecting ports 115 and 116. The operating principle of the scaling processor 112 is illustrated first by displaying single picture as an example.

The resolution of the image data I1 outputted by the image source device 120 is determined according to the display setting S1. Therefore, when the display device merely connects to the image source device 120 and displays a single picture through all of the pixel units of the display panel 111, the scaling processor 112 needs to perform scaling processing to the image data I1 via compression or interpolation to generate the image data I1' with the monitor resolution if the resolution of the image data I1 is not same as the monitor resolution of the display device 110. Based on this, by performing the scaling processing, the scaling processor 112 may be able to correspondingly drive each of the pixel units on the display panel 111 according to the image data I1' with the monitor resolution. For example, assuming that the resolution the image data I1 outputted by the image source device 120 is 640*480 and the monitor resolution of the display panel is 1024*768, the scaling processor 112 may transfer the image data I1 being 640*480 to the image data I1' being 1024*768 through interpolation to meet the demand for driving the display panel 111.

In the present embodiment, when the display device 110 operates in the multi-pictures display mode, the scaling processor 112 has capability of performing scaling processing to the image data I1 and I2 and drives the display panel 111 to display at least two pictures according to the scaled image data I1' and I2'. Specifically, the scaling processor 112 may perform the scaling processing to the image data I1' and I2' according to the picture number and the picture arrange manner of the multi-pictures display mode.

The memory 114 may be, for example, one or a combination of a stationary or mobile random access memory (RAM), a read-only memory (ROM), a flash memory, a hard drive, and other similar devices. The memory 114 stores the extended display identification data (EDID), and the monitor resolution of the display device 110 is recorded in the EDID. It should be noted that, in the present embodiment, the memory 114 is independently configured outside the scaling processor 112, however, in the other embodiment, the memory 114 may be configured inside the scaling processor 112.

The gravity sensor 113 may sense the rotation status of the display device 110. Specifically, the gravity sensor 113 is configured for sensing the gravity direction to determine the rotation status of the display device 110 is a transverse status and a longitudinal status. The connecting ports 115 and 116 are configured to transmit the image data and may be, for example, a video Graphics Array (VGA) connecting port, a digital visual interface (DVI) connecting port, a high-definition multimedia interface (HDMI) connecting port, a DisplayPortDP) connecting port or a thunderbolt interface connecting port and so on. The display device 110 may connect to the image source devices 120 and 130 through the connecting ports 115 and 116 to receive the image data I1 and I2 form the image source device 120-130 via the image transmitting cable.

Figure 4:
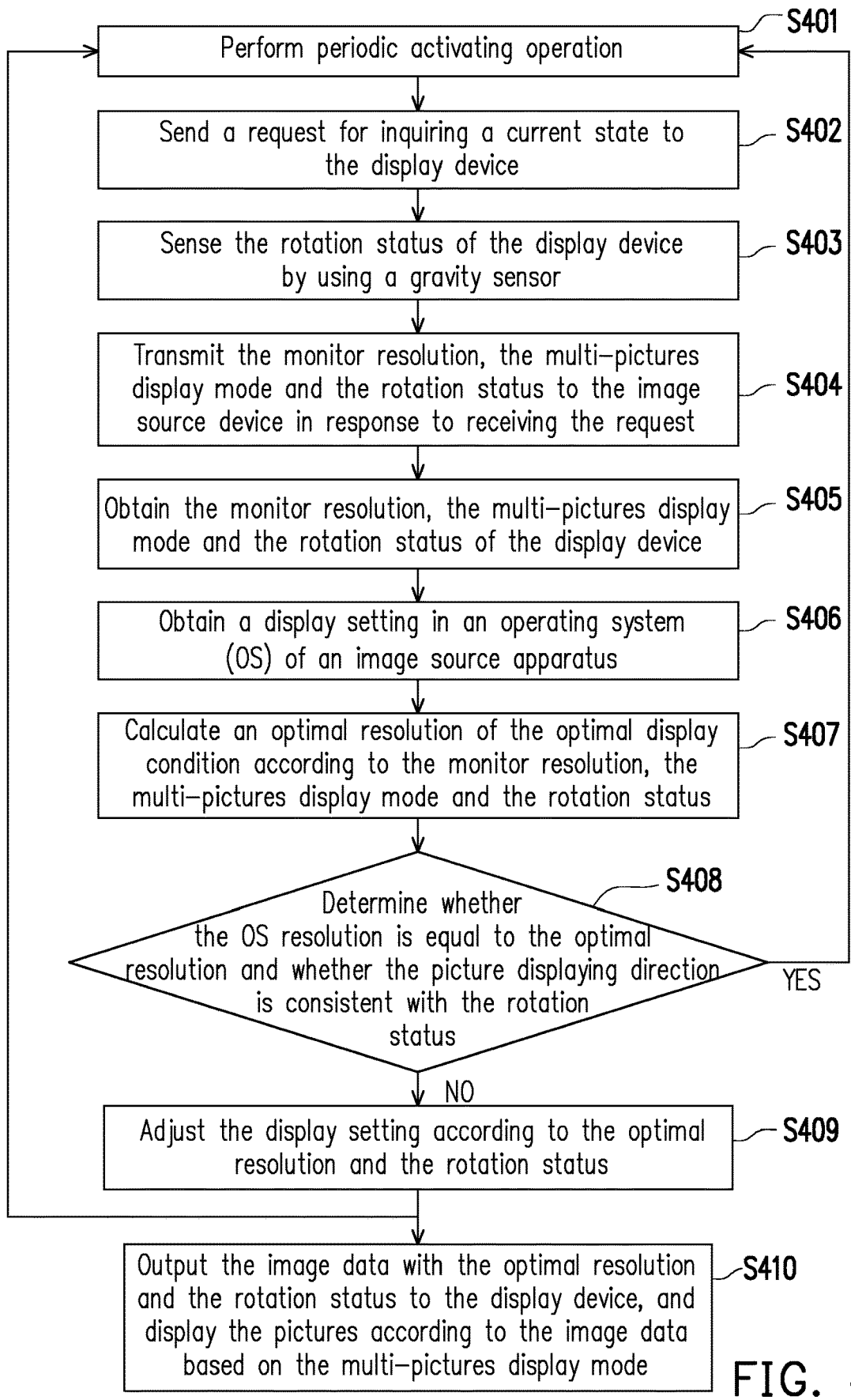
FIG. 4 illustrates a flowchart of a method for adjusting output images in accordance with one of exemplary embodiments of the disclosure.

FIG. 4 illustrates a flowchart of a method for adjusting output images in accordance with one of exemplary embodiments of the disclosure. Referring to FIG. 3 and FIG. 4, the method of the present embodiment is adapted to the multi-pictures display system 30 in FIG. 3. In the following, detailed steps of the method for adjusting output images of the present embodiment are explained with reference to the elements in the multi-pictures display system 30.

In the step S401, the processor 121 may perform periodic activating operation. Specifically, the processor 121 may periodically check the status of the display setting in the OS to periodically determine whether to adjust the display setting in the OS, so as to lower the consuming system computation resource. In the present embodiment, assuming the length of the cycle period is 20 seconds, every time the timer counts to 20 seconds, the processor 121 may be triggered to perform the net step S402.

In the step S402, the processor 121 of the image source device 120 may send a request for inquiring a current state to the display device 110. In the step S403, the scaling processor 112 may sense the rotation status of the display device 110 by using a gravity sensor 113. Next, in the step S404, the scaling processor 112 may transmit the monitor resolution, the multi-pictures display mode and the rotation status to the image source device 120 in response to receiving the request sent by the image source device 120. In the step S405, the processor 121 may obtain the monitor resolution the multi-pictures display mode and the rotation status of the display device 110.

In the step S406, the processor 121 may obtain the display setting S1 in the operating system OS1 of the image source device 120. In the step S407, the processor 121 may calculate an optimal resolution of the optimal display condition according to the monitor resolution, the multi-pictures display mode and the rotation status. In the step S408, the processor 121 may determine whether the OS resolution is equal to the optimal resolution and whether the picture displaying direction is consistent with the rotation status.

If the step S408 is determined as negative, in the step S409, the processor 121 may adjust the OS resolution and the picture displaying direction in the display setting S1 according to the optimal resolution and the rotation status. That is, the processor 121 may adjust the picture displaying direction match with the rotation status if the picture displaying direction is not consistent with the rotation status. The processor 121 may adjust the OS resolution to be equal to the optimal resolution if the OS resolution is not equal to the optimal resolution. After the step S409, returning to the step S401, the processor 121 may perform periodic activating operation again to use the timer to time, so as to cyclically perform the steps S401 to S409 periodically. In addition, in the step S410, the processor 121 may output the image data match the rotation status and having the optimal resolution the rotation status to the display device 110, and the display device 110 may display multiple pictures base on the multi-pictures display mode. That is, the scaling processor 112 does not need to perform the scaling processing to the image data I1 and the resolution of the image data I1 is same as the resolution of the image data I1'. Based on this way, when the display device 110 operates in the multi-pictures display mode, the image source device 120 may automatically adjust the display setting S1 and the use no longer need to setup the OS resolution manually, so as to enhance operation convenience for the user.

The following exemplary embodiments implemented according to the different multi-pictures display modes and the rotation statuses are described to illustrated the calculation of the optimal resolution of the optimal display condition. For the convenience of explanation, the following description is described by tacking the monitor resolution is 3840*2160 as example, but the disclosure is not limited thereto.

FIG. 5A to FIG. 5D illustrate exemplary examples of PBP mode with different rotation status.

Figure 5A:
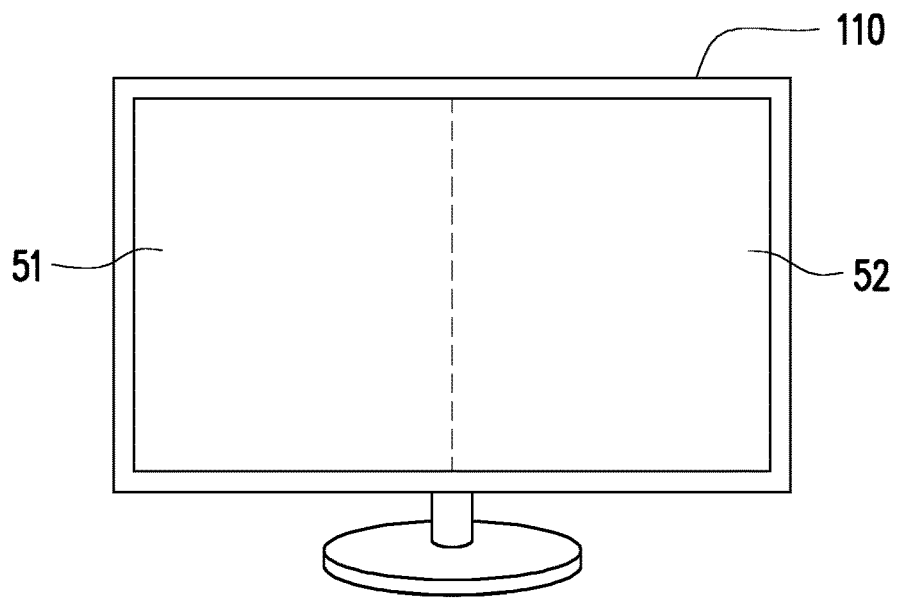
FIG. 5A to FIG. 5D illustrate exemplary examples of PBP mode with different rotation status.

Please referring to FIG. 5A, the rotation status of the display device 110 is the transverse status, and the multi-pictures display mode is the left/right PBP mode of the PBP mode. Hence, the display device 110 may display the pictures 51 and 52 together based on the transverse status and the left/right PBP mode. If the rotation status of the display device 110 is the transverse status, the processor 121 may setup the picture displaying direction of the display setting S1 to be consistent with the transverse status. Next, through dividing the horizontal resolution of the monitor resolution of the display device 110 by 2, the processor 121 may obtain the horizontal resolution of the optimal resolution. That is, if the monitor resolution of the display device 110 is 3840*2160, the processor 121 may calculate the optimal resolution as 1920*2160 and then adjust the OS resolution to 1920*2160 automatically. Therefore, the processor 121 may output the image data which has the optimal resolution 1920*2160 and match with the transverse status to the scaling processor 112 of the display device 110, and the display device 110 may display one of the pictures 51 and 52 according to the image data with the optimal resolution 1920*2160.

Figure 5B:
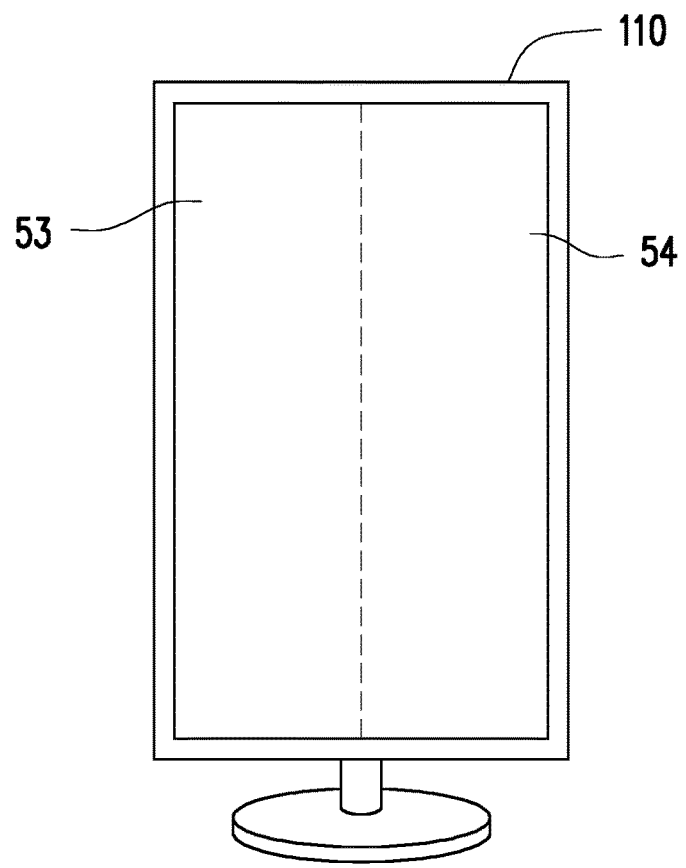

Please referring to FIG. 5B, the rotation status of the display device 110 is the longitudinal status, and the longitudinal status, and the multi-pictures display mode is the left/right PBP mode of the PBP mode. Hence, the display device 110 may display the pictures 53 and 54 based on the longitudinal status and the left/right PBP mode. If the rotation status of the display device 110 is the longitudinal, the processor 121 may setup the picture displaying direction of the display setting S1 to be consistent with the longitudinal status. Next, through dividing the vertical resolution of the monitor resolution of the display device 110 by 2, the processor 121 may obtain the horizontal resolution of the optimal resolution. That is, if the monitor resolution of the display device 110 is 3840*2160, the processor 121 may calculate the optimal resolution as 1080*3840 and then adjust the OS resolution to 1080*3840 automatically. Therefore, the processor 121 may output the image data which has the optimal resolution 1080*3840 and match with the longitudinal status to the scaling processor 112 of the display device 110, and the display device 110 may display one of the pictures 53 and 54 according to the image data with the optimal resolution 1080*3840.

Figure 5C:
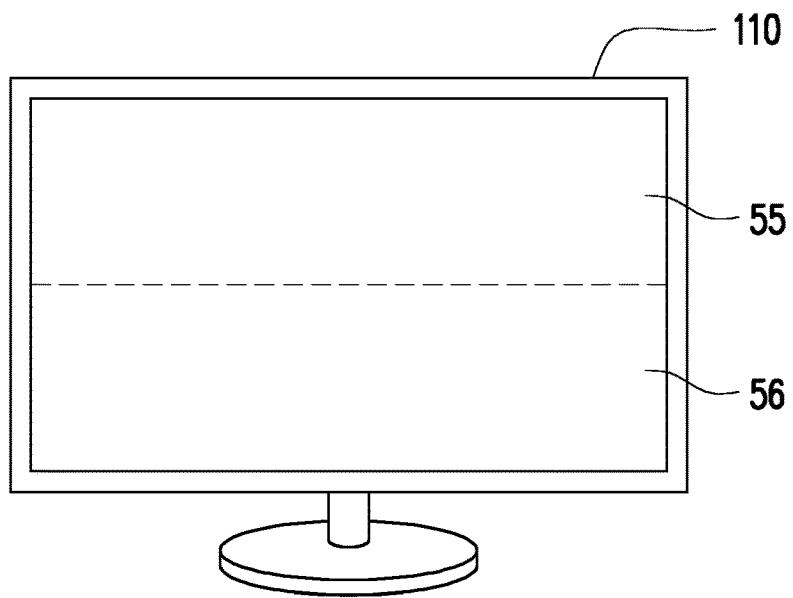

Please referring to FIG. 5C, the rotation status of the display device 110 is the transverse status, and the multi-pictures display mode is the up/down PBP mode of the PBP mode. Hence, the display device 110 may display the pictures 55 and 56 together based on the transverse status and the up/down PBP mode. If the rotation status of the display device 110 is the transverse status, the processor 121 may setup the picture displaying direction of the display setting S1 to be consistent with the transverse status. Next, through dividing the vertical resolution of the monitor resolution of the display device 110 by 2, the processor 121 may obtain the vertical resolution of the optimal resolution. That is, if the monitor resolution of the display device 110 is 3840*2160, the processor 121 may calculate the optimal resolution as 3840*1080 and then adjust the OS resolution to 3840*1080 automatically. Therefore, the processor 121 may output the image data which has the optimal resolution 3840*1080 and match with the transverse status to the scaling processor 112 of the display device 110, and the display device 110 may display one of the pictures 55 and 56 according to the image data with the optimal resolution 3840*1080.

Figure 5D:
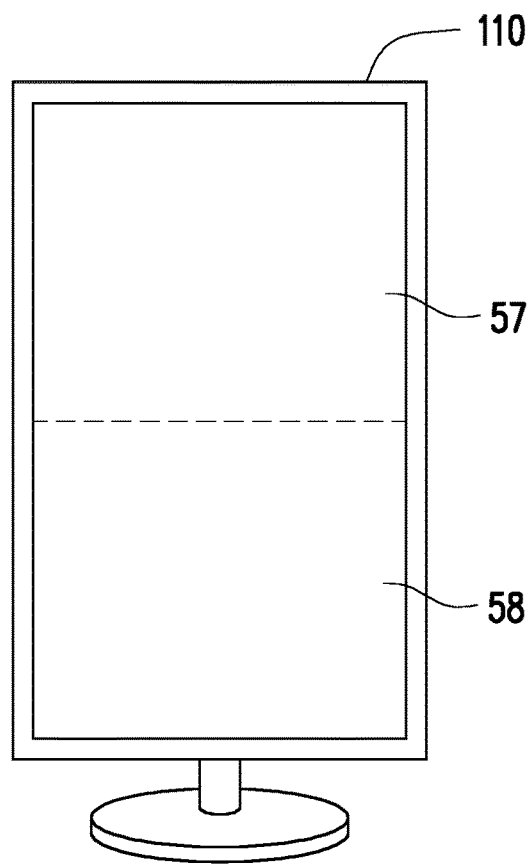

Please referring to FIG. 5D, the rotation status of the display device 110 is the longitudinal status, and the longitudinal status, and the multi-pictures display mode is the up/down PBP mode of the PBP mode. Hence, the display device 110 may display the pictures 57 and 58 together based on the longitudinal status and the up/down PBP mode. If the rotation status of the display device 110 is the longitudinal status, the processor 121 may setup the picture displaying direction of the display setting S1 to be consistent with the longitudinal status. Next, through dividing the horizontal resolution of the monitor resolution of the display device 110 by 2, the processor 121 may obtain the vertical resolution of the optimal resolution. That is, if the monitor resolution of the display device 110 is 3840*2160, the processor 121 may calculate the optimal resolution as 2160*1920 and then adjust the OS resolution to 2160*1920 automatically. Therefore, the processor 121 may output the image data which has the optimal resolution 2160*1920 and match with the longitudinal status to the scaling processor 112 of the display device 110, and the display device 110 may display one of the pictures 57 and 58 according to the image data with the optimal resolution 2160*1920.

However, it should be noted that, it is illustrated by tacking the sizes of the two side-by-side pictures are the same as example, but the disclosure is not limited in the regard. In one of the embodiments, if the sizes of the two side-by-side pictures are different, the optimal resolution may be calculated out according to the ratio between the sizes of the two side-by-side pictures.

Figure 6A:
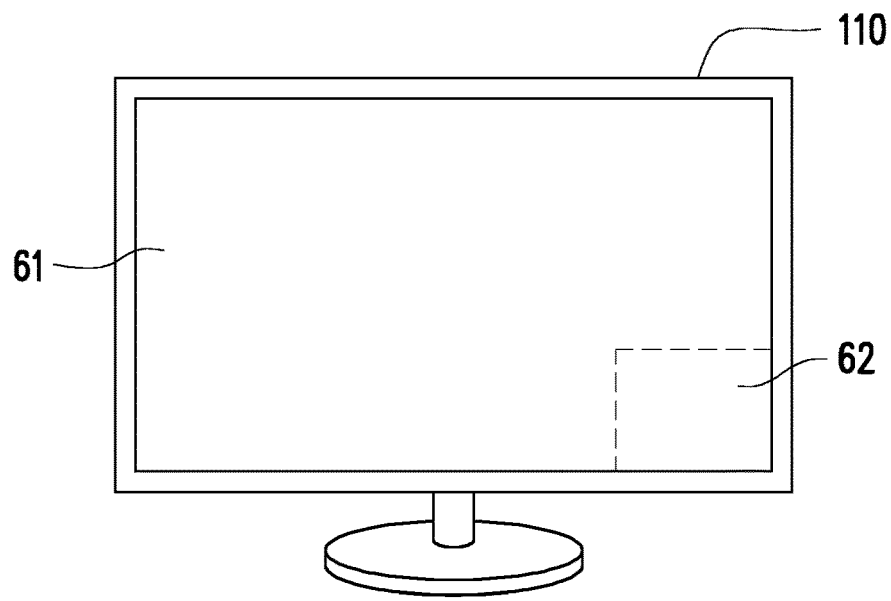
FIG. 6A to FIG. 6B illustrate exemplary examples of PIP mode with different rotation status.
Figure 6B:
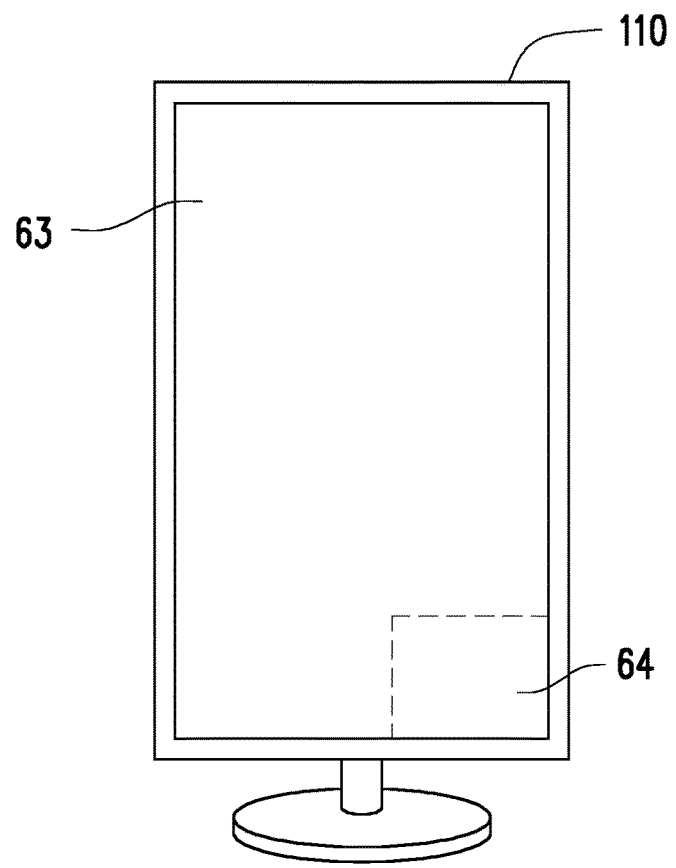

FIG. 6A to FIG. 6B illustrate exemplary examples of PIP mode with different rotation status.

Please referring to FIG. 6A, the rotation status of the display device 110 the rotation status is the transverse status, and the multi-pictures display mode is the PIP mode. Hence, the display device 110 may display the pictures 61 and 62 together based on the transverse status and the PIP mode. If the rotation status of the display device 110 is the transverse status, the processor 121 may setup the picture displaying direction of the display setting S1 to be consistent with the transverse status. Next, if the image source device 120 is the provider providing the image data of the main picture 61, the processor 121 may not need to change the OS resolution of the display setting S1 or may setup the OS resolution of the display setting S1 as same as the monitor resolution. That is, if the image source device 120 is the provider providing the image data of the main picture 61, the processor 121 may obtain the optimal resolution being 3840*2160 and then adjust the OS resolution to 3840*2160 automatically when the monitor resolution of the display device 110 is 3840*2160. On the other hand, if the image source device 120 is the provider providing the image data of the sub-picture 62, the processor 121 may not change the OS resolution of the display setting S1, and the scaling processor 112 may perform the scaling processing according to the size of the sub-picture 62.

Please referring to FIG. 6B, the rotation status of the display device 110 is the longitudinal status, and the multi-pictures display mode is the PIP mode. Hence, the display device 110 may display the pictures 63 and 64 together based on the longitudinal status and the PIP mode. If the rotation status of the display device 110 is the longitudinal status, the processor 121 may setup the picture displaying direction of the display setting S1 to be consistent with the longitudinal status. Next, if the image source device 120 is the provider providing the image data of the main picture 63, the processor 121 may setup the vertical resolution of the optimal resolution as the horizontal resolution of the monitor resolution and setup the horizontal resolution of the optimal resolution as the vertical resolution of the monitor resolution. That is, if the image source device 120 is the provider providing the image data of the main picture 63, the processor 121 may obtain the optimal resolution being 2160*3840 and then adjust the OS resolution to 2160*3840 automatically when the monitor resolution of the display device 110 is 3840*2160. On the other hand, if the image source device 120 is the provider providing the image data of the sub-picture 64, the processor 121 may not change the OS resolution of the display setting S1, and the scaling processor 112 may perform the scaling processing according to the size of the sub-picture 64.

Figure 7A:
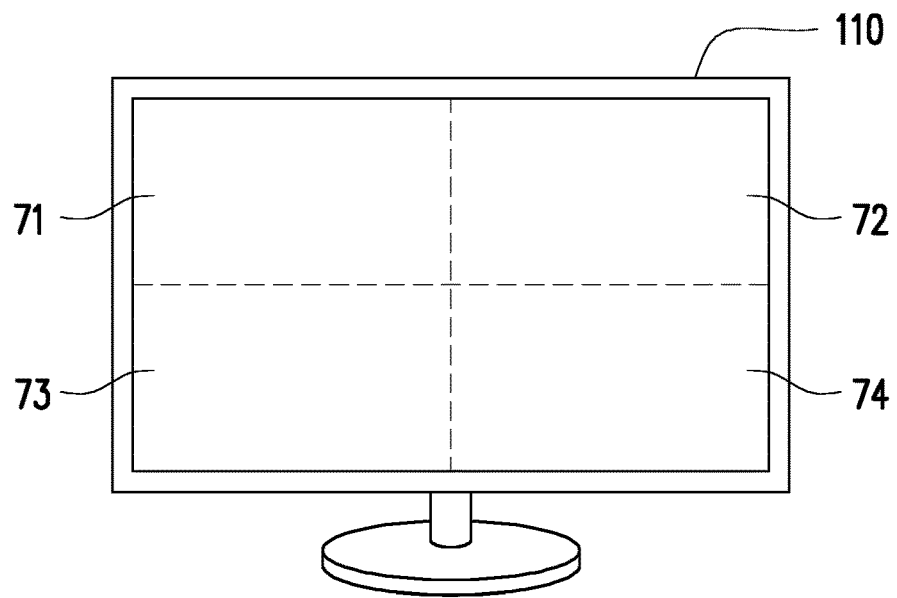
FIG. 7A to FIG. 7B illustrate exemplary examples of 4-split POP mode with different rotation status.
Figure 7B:
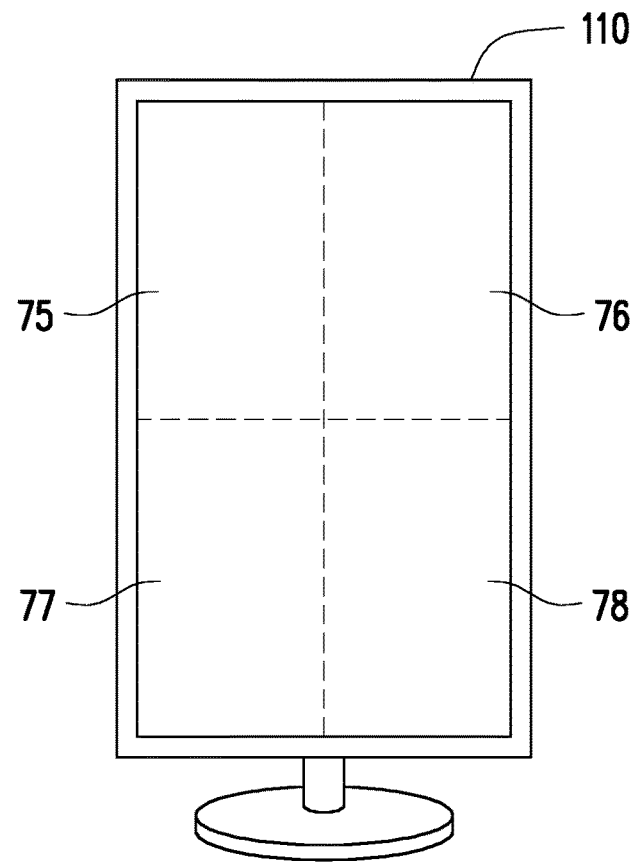

FIG. 7A to FIG. 7B illustrate exemplary examples of 4-split POP mode with different rotation status.

Please referring to FIG. 7A, the rotation status of the display device 110的 the rotation status is the transverse status, and the multi-pictures display mode is the 4-split POP mode. Hence, the display device 110 may display the pictures 71, 72, 73 and 74 together based on the transverse status and the 4-split POP mode. If the rotation status of the display device 110 is the transverse status, the processor 121 may setup the picture displaying direction of the display setting S1 to be consistent with the transverse status. Next, through dividing the vertical resolution of the monitor resolution of the display device 110 by 2, the processor 121 may obtain the vertical resolution of the optimal resolution. In addition, through dividing the horizontal resolution of the monitor resolution of the display device 110 by 2, the processor 121 may obtain the horizontal resolution of the optimal resolution. That is, if the monitor resolution of the display device 110 is 3840*2160, the processor 121 may obtain the optimal resolution being as 1920*1080 and then adjust the OS resolution to 1920*1080 automatically. Therefore, the processor 121 may output the image data which has the optimal resolution 1920*1080 and match with the transverse status to the scaling processor 112 of the display device 110, and the display device 110 may display one of the pictures 71, 72, 73 and 74 according to the image data with the optimal resolution 1920*1080.

Please referring to FIG. 7B, the rotation status of the display device 110 is the longitudinal status, and the multi-pictures display mode is the 4-split POP mode. Hence, the display device 110 may display the pictures 75, 76, 77 and 78 together based on the longitudinal status and the 4-split POP mode. If the rotation status of the display device 110 is the longitudinal status, the processor 121 may setup the picture displaying direction of the display setting S1 to be consistent with the longitudinal status. Next, through dividing the horizontal resolution of the monitor resolution of the display device 110 by 2, the processor 121 may obtain the vertical resolution of the optimal resolution. In addition, through dividing the vertical resolution of the monitor resolution of the display device 110 by 2, the processor 121 may obtain the horizontal resolution of the optimal resolution. That is, if the monitor resolution of the display device 110 is 3840*2160, the processor 121 may obtain the optimal resolution being as 1080*1920 and then adjust the OS resolution to 1080*1920 automatically. Therefore, the processor 121 may output the image data which has the optimal resolution 1080*1920 and match with the longitudinal status to the scaling processor 112 of the display device 110, and the display device 110 may display one of the pictures 75, 76, 77 and 78 according to the image data with the optimal resolution 1080*1920.

However, it should be noted that, it is illustrated by tacking the sizes of the four split pictures are the same as example, but the disclosure is not limited in the regard. In one of the embodiments, if the sizes of the split pictures are different, the optimal resolution may able to be calculated according to the ratio between the sizes of the four split pictures.

In view of the aforementioned descriptions, in the embodiments of the disclosure, the image source device providing the image data may automatically adjust the display setting in the operating system according to the multi-pictures display mode and the rotation status, such that the image source device can output the image data with the optimal resolution and correct display direction based on the display setting in the operating system. Accordingly, the situation of the displayed picture being distorted can be avoided so as to provide good multi-pictures display effect. Besides, by eliminating the need for the users to manually set the resolution, the user experience can be further enhanced.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for adjusting output image, wherein an image source device provides image data to a display device, and the method comprises:
    obtaining a monitor resolution, a multi-pictures display mode and a rotation status of the display device;
    obtaining a display setting in an operating system (OS) of the image source device;
    determining an optimal display condition according to the monitor resolution, the multi-pictures display mode and the rotation status so as to determine whether the display setting in the OS satisfies the optimal display condition; and
    adjusting the display setting in the OS according to the optimal display condition if the display setting does not satisfy the optimal display condition, such that the image source device outputs the image data satisfying an optimal resolution and the rotation status of the display device according to the display setting in the OS,
    wherein if the display setting satisfies the optimal display condition, a plurality of pixels of a single frame outputted by the image source device is one-by-one corresponding to a plurality of pixel unit of the display device configured to display the single frame.

2. The method according to claim 1, wherein the display setting in the OS comprises an OS resolution and a picture displaying direction.

3. The method according to claim 2, wherein the step of determining whether the display setting satisfies the optimal display condition according to the monitor resolution, the multi-pictures display mode and the rotation status comprises:
    calculating the optimal resolution of the optimal display condition according to the monitor resolution, the multi-pictures display mode and the rotation status; and
    determining whether the OS resolution is equal to the optimal resolution.

4. The method according to claim 2, wherein the step of determining whether the display setting satisfies the optimal display condition according to the monitor resolution, the multi-pictures display mode and the rotation status comprises:
    determining the picture displaying direction of the display setting is consistent with the rotation status.

5. The method according to claim 2, wherein the multi-pictures display mode comprises a picture in picture (PIP) mode, a picture by picture (PBP) mode, and a picture on picture (POP) mode.

6. The method according to claim 1, wherein the rotation status comprises a transverse status and a longitudinal status.

7. The method according to claim 1, wherein the method further comprises:
    sensing the rotation status of the display device by using a gravity sensor; and
    transmitting the rotation status to the image source device.

8. The method according to claim 1, wherein the monitor resolution is recorded in extended display identification data (EDID).

9. A multi-pictures display system, comprises:
    a display device;
    an image source device, providing image data to the display device and comprising:
        a memory element, recording an operating system and an adjusting module; and
        a processor, coupled to the memory element, and configured to execute the operating system and the adjusting module to:
    obtain a monitor resolution, a multi-pictures display mode and a rotation status of the display device;
    obtain a display setting in an operating system (OS) of the image source device;
    determine an optimal display condition according to the monitor resolution, the multi-pictures display mode and the rotation status so as to determine whether the display setting in the OS satisfies the optimal display condition; and
    adjust the display setting in the OS according to the optimal display condition if the display setting does not satisfy the optimal display condition, such that the image source device outputs the image data satisfying an optimal resolution and the rotation status of the display device according to the display setting in the OS,
    wherein if the display setting satisfies the optimal display condition, a plurality of pixels of a single frame outputted by the image source device is one-by-one corresponding to a plurality of pixel unit of the display device configured to display the single frame.

10. The system according to claim 9, wherein the display device comprises:
    a display panel, displaying a picture of the image data; and
    a scaling processor, couple to the display panel, receiving the image data and driving the display panel according to the image data,
    wherein the scaling processor transmits the monitor resolution, the multi-pictures display mode and the rotation status to the processor in response to receiving a request sent by the processor.

* * * * *